United States Patent
Holst et al.

(10) Patent No.: US 9,845,743 B2
(45) Date of Patent: Dec. 19, 2017

(54) CONTROLLING AN INTERNAL COMBUSTION ENGINE OPERATED ON GASEOUS FUEL

(71) Applicant: Caterpillar Motoren GmbH & Co. KG, Kiel (DE)

(72) Inventors: Hauke Holst, Altenholz (DE); Hendrik Johannes Lange, Kiel (DE); Eike Joachim Sixel, Kiel (DE); Marius Wolfgramm, Kiel (DE); Arvind Sivasubramanian, Peoria, IL (US)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 108 days.

(21) Appl. No.: 14/852,878

(22) Filed: Sep. 14, 2015

(65) Prior Publication Data

US 2016/0084179 A1 Mar. 24, 2016

(30) Foreign Application Priority Data

Sep. 19, 2014 (EP) .................... 14185552

(51) Int. Cl.
*F02D 41/14* (2006.01)
*F02P 9/00* (2006.01)
(Continued)

(52) U.S. Cl.
CPC ..... *F02D 41/0027* (2013.01); *F02D 19/0642* (2013.01); *F02D 35/023* (2013.01);
(Continued)

(58) Field of Classification Search
CPC .. F02D 19/0642; F02D 19/124; F02D 19/105; F02D 19/02; F02D 19/0647;
(Continued)

(56) References Cited

U.S. PATENT DOCUMENTS

2009/0031987 A1* 2/2009 Tanaka ................ F02D 41/0025
123/406.3
2010/0131173 A1* 5/2010 Willi ...................... F02D 13/02
701/103
(Continued)

FOREIGN PATENT DOCUMENTS

EP 1593824 A2 11/2005
EP 2682588 A1 1/2014
(Continued)

OTHER PUBLICATIONS

European Search Report issued in European Patent Application No. 14185552, dated May 7, 2015 (2 pages).

*Primary Examiner* — Lindsay Low
*Assistant Examiner* — George Jin

(57) ABSTRACT

A method for controlling an internal combustion engine operating on at least partly gaseous fuel is disclosed. The method may include providing a desired burn rate profile corresponding to a desired operation of the internal combustion engine. The method may further include selecting first operating parameters such that an operation of the internal combustion engine with a first gas composition produces a first burn rate profile that corresponds to the desired burn rate profile. The method may also include operating the internal combustion engine with the first operating parameters using a second gas composition. The method may include determining that the second burn rate profile differs from the desired burn rate profile. In addition, the method may include adjusting an operating parameter from among the first operating parameters of the internal combustion engine to approach the desired burn rate profile.

16 Claims, 6 Drawing Sheets

(51) Int. Cl.
    *F02D 41/00*     (2006.01)
    *F02D 19/06*     (2006.01)
    *F02D 35/02*     (2006.01)
    *F02D 37/02*     (2006.01)

(52) U.S. Cl.
    CPC ......... *F02D 37/02* (2013.01); *F02D 41/1475*
        (2013.01); *F02P 9/002* (2013.01); *Y02T 10/36*
                                                  (2013.01)

(58) Field of Classification Search
    CPC ...... F02D 19/08; F02D 19/085; F02D 35/023;
                                             F02D 41/0027
    See application file for complete search history.

(56)                References Cited

U.S. PATENT DOCUMENTS

| 2013/0238217 | A1* | 9/2013 | Nolan | F02D 41/3845 |
| | | | | 701/102 |
| 2013/0255628 | A1* | 10/2013 | Moren | F02B 69/04 |
| | | | | 123/406.29 |
| 2015/0219027 | A1* | 8/2015 | zur Loye | F02D 41/0027 |
| | | | | 60/603 |
| 2016/0115882 | A1* | 4/2016 | Imhof | F02D 19/061 |
| | | | | 123/525 |

FOREIGN PATENT DOCUMENTS

| EP | 2708722 A1 | 3/2014 |
| WO | WO 2005/031134 A1 | 4/2005 |
| WO | WO 2012/013368 A1 | 8/2012 |

\* cited by examiner

CONTROLLING AN INTERNAL COMBUSTION ENGINE OPERATED ON GASEOUS FUEL

CLAIM FOR PRIORITY

This application claims benefit of priority of European Patent Application No. EP 14185552.8, filed Sep. 19, 2014, which is incorporated herein by reference.

TECHNICAL FIELD

The present disclosure generally relates to an internal combustion engine during operation on at least partly gaseous fuel, and in particular in case the gas composition changes.

BACKGROUND

Internal combustion engines operating at least partly on gaseous fuel typically use, for example, natural gas or bio-gas as an energy source for combustion. Those gaseous fuels commonly comprise a blend of different hydrocarbons such as methane and higher hydrocarbons as well as inert gases. The composition of those gaseous fuels may vary, for example, when gaseous fuels from different gas fields or gas reservoirs are used. The variation of the gas composition may also occur during operation of the internal combustion engine due to changes in the gas quality present in those gas reservoirs.

Variations of the gas composition may also affect an energy content of the gaseous fuel, for example, due to varying amounts of higher hydrocarbons in the gaseous fuel. As a result, the internal combustion engine may be subjected to a change or variation in energy content. Variations of the gas composition may therefore have an impact on the operation of the internal combustion engine.

The present disclosure is directed, at least in part, to improving or overcoming one or more aspects of prior systems.

SUMMARY OF THE DISCLOSURE

According to one aspect of the present disclosure, a method for controlling an internal combustion engine during operation on at least partly gaseous fuel is disclosed. The method comprises providing a desired burn rate profile corresponding to a desired operation of the internal combustion engine, and first operating parameters that are selected such that an operation of the internal combustion engine with a first gas composition obtains a first burn rate profile that corresponds to the desired burn rate profile. The method further comprises operating the internal combustion engine with the first operating parameters on a second gas composition, determining that a second burn rate profile differs from the desired burn rate profile thereby indicating that the second gas composition differs from the first gas composition, and adapting an operating parameter of the first operating parameters of the internal combustion engine to approach the desired burn rate profile.

According to another aspect of the present disclosure, a method for controlling an internal combustion engine during operation on at least partly gaseous fuel with varying gas composition is disclosed. The method comprises providing a desired burn rate profile corresponding to a desired operation of the internal combustion engine, operating the internal combustion engine under an initial operating condition such that an initial burn rate profile associated with the combustion process corresponds essentially to the desired burn rate profile. The method further comprises, monitoring a temporal development of the burn rate profile over a time period of potential variation in gas composition, while maintaining an operating parameter associated with the desired burn rate profile, such as a power output, an efficiency or exhaust gas emissions. The method further comprises determining that an actual burn rate profile differs from the desired burn rate profile thereby indicating a variation in gas composition, and adapting an operating parameter of the internal combustion engine to enforce a burn rate profile that is adjusted to the desired burn rate profile.

According to another aspect of the present disclosure, a control system for an internal combustion engine during operation on at least partly gaseous fuel is disclosed. The control system comprises a pressure sensor configured to detect a cylinder pressure profile of the internal combustion engine and a control unit connected to the pressure sensor and configured to perform the method as exemplary disclosed herein.

According to yet another aspect, an internal combustion engine during operation on at least partly gaseous fuel is disclosed. The internal combustion engine comprises a pressure sensor configured to detect a cylinder pressure profile of the internal combustion engine, and a control unit connected to the pressure sensor and configured to perform the method as exemplary disclosed herein.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings.

DETAILED DESCRIPTION

Figure 1:
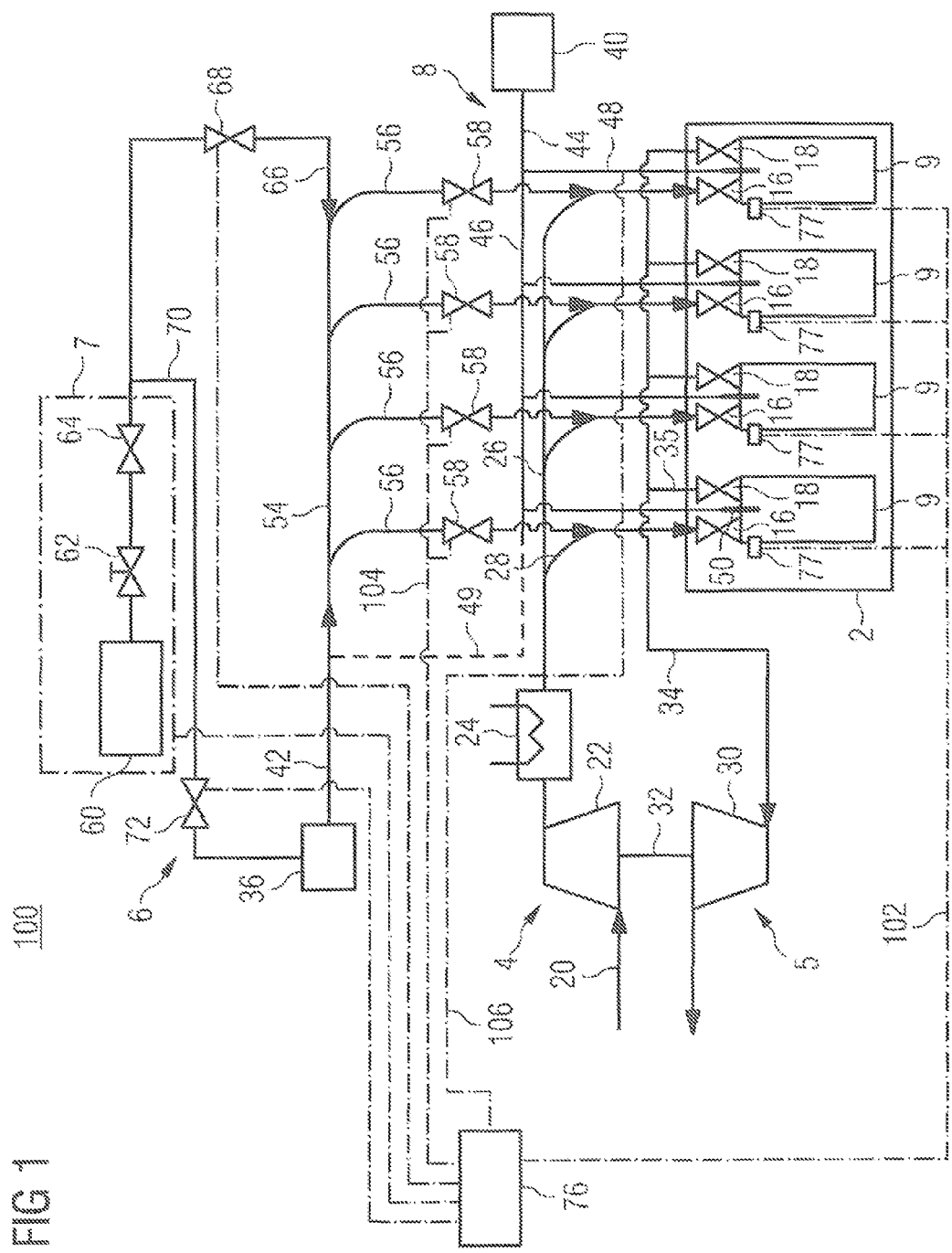
FIG. 1 shows a schematic drawing of an exemplary internal combustion engine operable at least partly on gaseous fuel.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure is based in part on the realization that a variation in gas composition, resulting for example in a change in a lower heating value and/or Methane Number of the gaseous fuel, can be associated with a change in a burn rate profile of a cylinder of an internal combustion engine. The burn rate commonly represents the mass fraction of burnt fuel over time or crank angle during a combustion event of one combustion cycle in an internal combustion engine.

It was realized that, if the internal combustion engine is provided with a first set of operating parameters which would obtain a desired burn rate profile for operation on a first gas composition, the internal combustion engine may no longer obtain that desired burn rate profile, when the internal combustion engine is supplied with a gaseous fuel of a second gas composition different from the first one.

The variation in gas composition may occur, for example, when the internal combustion engine is tuned to factory settings at the engine manufacturer site using the gas composition of the engine manufacturer, and then is shipped to the costumer site, where the internal combustion engine is operated with the gaseous fuel of the costumer having a different gas composition than the engine manufacturer.

It was also realized that, a change in gas composition may occur during operation using a gaseous fuel with a varying gas composition. Thus, it was realized that, while monitoring an actual burn rate profile during operation of the internal combustion engine, the burn rate profile may differ from the desired burn rate profile. This change may happen although—during monitoring of the burn rate profile—an operating condition of the internal combustion engine was essentially maintained, such as a power output, an efficiency or exhaust gas emissions. The determined difference between the burn rate profile and the desired burn rate profile may occur over a time period of, for example, several seconds to 120 min or more. That time period is longer that a time period usually associated with changes in the burn rate profile caused by other phenomena than the described varying gas composition, such as cycle-to-cycle variations during operation of the internal combustion engine.

The present disclosure is further based in part on the realization that—once a difference between the burn rate profile and a desired burn rate profile has been determined—an operating parameter of the internal combustion engine may be adapted to again approach the desired burn rate profile. In particular, it was realized that certain parameters of the burn rate profile such as a combustion duration, a start of combustion, or a center of combustion may be adjusted by adapting an air-to-fuel ratio, an ignition timing or an ignition energy (amount or pressure of ignition fuel in case of DF or Diesel-gaseous fuel internal combustion engines, or an air-to-fuel ratio in a pre-combustion chamber of a Otto-gaseous fuel internal combustion engine) of a cylinder associated with the determined difference between the actual burn rate profile and the desired burn rate profile.

An internal combustion engine operable at least partly on gaseous fuel, and exemplary procedures for controlling the same are described in connection with FIGS. 1 to 3, and FIGS. 4 to 7, respectively.

Figure 2:
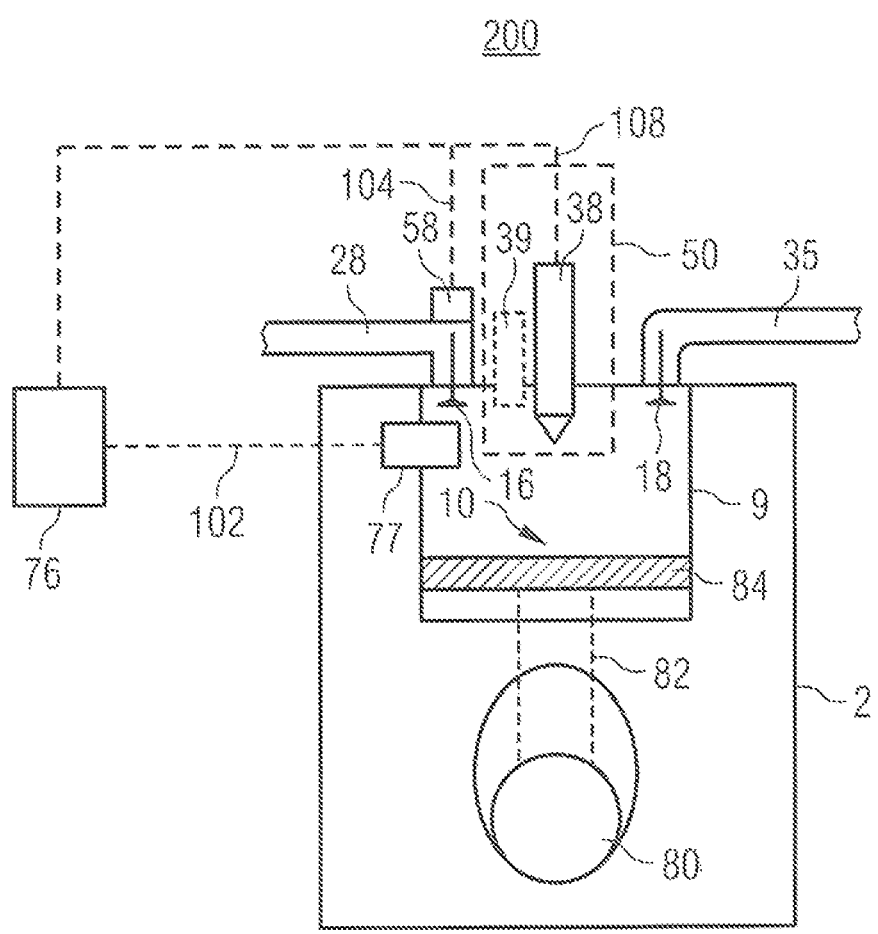
FIG. 2 shows a schematic cross-sectional view of a cylinder of a dual fuel (DF) internal combustion engine.
Figure 3:
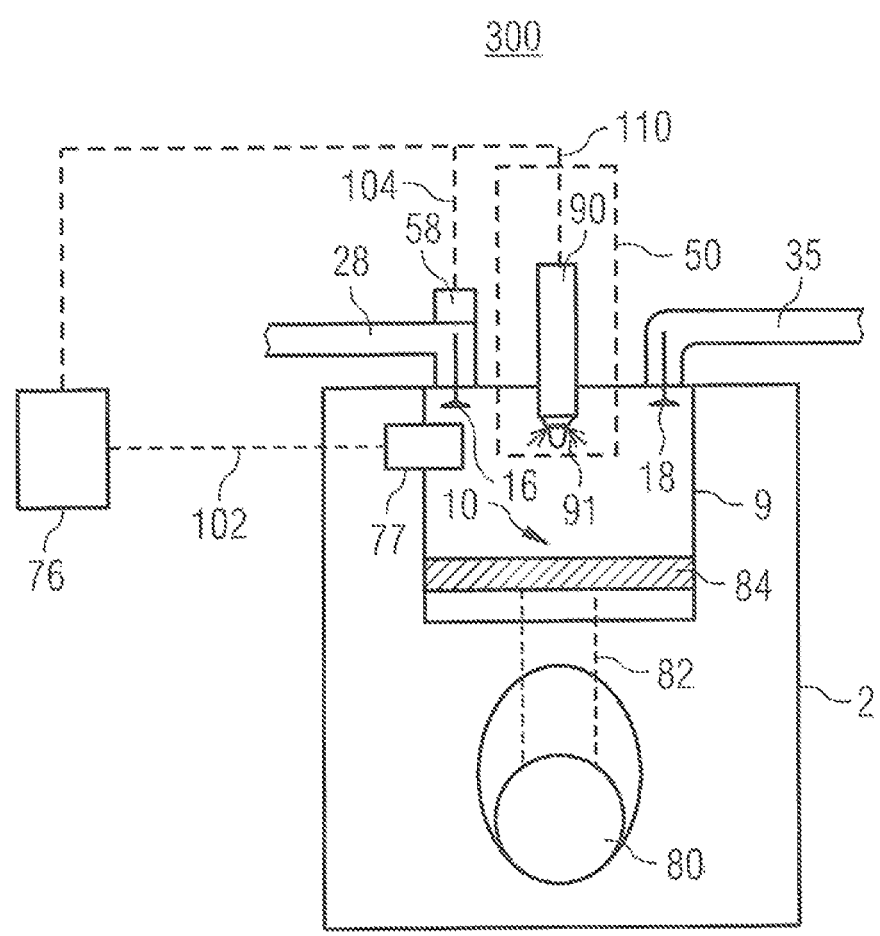
FIG. 3 shows a schematic cross-sectional view of a cylinder of a gaseous fuel internal combustion.

FIG. 1 shows schematically an exemplary internal combustion engine 100 operating at least partly on gaseous fuel, such as a DF engine (illustrated schematically in FIG. 2) or a gaseous fuel engine (illustrated schematically in FIG. 3).

Internal combustion engine 100 comprises an engine block 2, a charge air system 4, an exhaust gas system 5, a gaseous fuel system 6 including a purge gas system 7 and/or a liquid fuel system 8. Internal combustion engine 100 can be powered with a liquid fuel such as, for example, diesel fuel in a liquid fuel mode (LFM), and with a gaseous fuel such as natural gas provided, for example, by an LNG-system, in a gaseous fuel mode (GFM).

Engine block 2 comprises a plurality of cylinders. Exemplarily, four cylinders 9 are depicted in FIG. 1. Engine block 2 may be of any size, with any number of cylinders, such as 6, 8, 12, 16 or 20, and in any configuration, for example, "V", in-line or radial configuration.

Each cylinder 9 is equipped with at least one inlet valve 16 and at least one outlet valve 18. Inlet valves 16 are fluidly connected to charge air system 4 and configured to provide charge air, or a mixture of charge air and gaseous fuel into cylinders 9. Analogue, outlet valves 18 are fluidly connected to exhaust gas system 5 and configured to direct exhaust gas out of respective cylinder 9.

Charge air is provided by charge air system 4 including an air intake 20, a compressor 22 to charge air, and a charge air cooler 24. A charge air manifold 26 is fluidly connected downstream of charge air cooler 24 and guides charge air via cylinder specific inlet channels 28 into respective cylinders 9.

Exhaust gas system 5 includes an exhaust gas turbine 30 connected to compressor 22 via shaft 32 and an exhaust gas manifold 34 guiding exhaust gas from individual exhaust gas outlet channels 35 to exhaust gas turbine 30.

Charge air system 4 may comprise one or more charge air manifolds 26. Similarly, exhaust gas system 5 may comprise one or more exhaust gas manifolds 34.

In addition, inlet valves 16 and outlet valves 18 may be installed within inlet channels 28 and outlet channels 35, respectively. Inlet channels 28 as well as outlet channels 35 may be provided within a common cylinder head or individual cylinder heads covering cylinders 9.

Gaseous fuel system 6 comprises a gaseous fuel source 36 connected to gaseous fuel piping 42. Gaseous fuel source 36 constitutes a gaseous fuel feed for supplying gaseous fuel for combustion in GFM. For example, gaseous fuel source 36 comprises a gas valve unit and a gaseous fuel tank that contains natural gas in a pressurized state.

Gas valve unit is configured to allow, to block, and to control flow from gaseous fuel tank into gaseous fuel piping 42. The gas valve unit may comprise gaseous fuel control valves, gaseous fuel shut-off valves and venting valves.

Gaseous fuel piping 42 is fluidly connected to a gaseous fuel manifold 54 which splits into a plurality of gaseous fuel channels 56. Each gaseous fuel channel 56 is fluidly connected to one of the plurality of inlet channels 28. To dose gaseous fuel into individual inlet channels 28, in each gaseous fuel channel 56, a gaseous fuel admission valve 58 is installed. In some embodiments, internal combustion engine 100 may comprise more than one gaseous fuel manifold 54.

Each gaseous fuel admission valve 58 is configured to allow or to block flow of gaseous fuel into an individual inlet channel 28 to mix with compressed charge air from charge air system 4 in GFM. Thus, cylinder specific mixing zones downstream of each gaseous fuel admission valve 58 are generated. For example, gaseous fuel admission valves 58 may be solenoid actuated plate valves in which springs hold a lower surface of a movable disk against an upper surface of a stationary disk or plate, the two surfaces being configured to provide a sealed relationship in a closed state of gaseous fuel admission valve 58. Each gaseous fuel admission valve 58 may be mounted to a cylinder head covering at least one cylinder 9.

Purge gas system 7 (indicated in FIG. 1 by a dashed dotted box) comprises a purge gas tank 60, a purge gas control valve 62, and a purge gas shut-off valve 64 connected in series. Purge gas tank 60 constitutes a purge gas source to flush gaseous fuel piping 42, gaseous fuel manifold 54, etc. with a purge gas, such as nitrogen in a pressurized state.

Purge gas system 7 may be fluidly connected to gaseous fuel system 6 at various locations. For example, in FIG. 1 a first connection 66 is disposed proximal to the gaseous fuel manifold 54. A second connection 70 is disposed proximal to gaseous fuel source 36. First shut-off valve 68 and second shut-off valve 72 can block or allow a purge gas flow through first connection 66 and second connection 70, respectively. Additional connections may be integrated in gas valve unit of gaseous fuel source 36.

As previously mentioned, FIG. 1 illustrates a DF internal combustion engine as well as a gaseous fuel engine. In a DF internal combustion engine, liquid fuel system 8 comprises a liquid fuel tank 40 connected to liquid fuel piping 44. Liquid fuel tank 40 may comprise a first liquid fuel tank for storing a first liquid fuel, for example, heavy fuel oil (HFO), and a second liquid fuel tank for storing a second liquid fuel, for example, diesel fuel. Liquid fuel tank 40 constitutes a liquid fuel source for supplying liquid fuel for combustion in LFM. Additionally, liquid fuel tank 40 may constitute a liquid fuel source for supplying ignition fuel in GFM.

Liquid fuel piping 44 is fluidly connected to a liquid fuel manifold 46 which splits into a plurality of liquid fuel inlet channels 48. To dose liquid fuel into the combustion chamber of cylinder 9, in each liquid fuel inlet channel 48 a fuel injection system 50 is installed.

In a gaseous fuel internal combustion engine, such as a spark ignited gaseous fuel internal combustion engine, fuel injection system 50 is fluidly connected to gaseous fuel source 36 (indicated by a dashed line 49) instead of liquid fuel tank 40. In this embodiment fuel injection system 50 may comprise a pre-combustion chamber for providing spark ignited pilot flames 91 (see FIG. 3) to ignite the mixture of gaseous fuel and air.

Exemplary embodiments of fuel injection system 50 for DF and gaseous fuel internal combustion engines are described in more detail when referring to FIGS. 2 and 3, respectively.

As shown in FIG. 1, internal combustion engine 100 further comprises a plurality of pressure sensors 77 mounted at each cylinder 9. Each pressure sensor 77 is configured to generate a signal corresponding to a temporal development of an internal cylinder pressure during the operation of the engine, for example, during combustion. The pressure sensor is further described when referring to FIG. 2.

To control operation of internal combustion engine 100, a control unit 76 is provided. Control unit 76 forms part of a control system of the engine. Control unit 76 is configured to receive data of pressure sensor 77 via a readout connection line 102. Control unit 76 may further be configured to control various components of internal combustion engine 100 such as gaseous fuel admission valves 58 via a control connection line 104 and fuel injection system 50 via a control connection line 106. Control unit 76 may further be configured to control valves of purge gas system 7. Alternatively, a second control unit (not shown) may be configured to control the operation of internal combustion engine 100. Further description of the control system and additional control lines between control unit 76 and other components of the engine, such as the fuel injection system 50, will be given in FIGS. 2 and 3.

Control unit 76 may further be connected to other sensors not shown in FIG. 1, such as engine load sensors, engine speed sensors, temperature sensors, NOx-sensors, or fuel-to-air ratio sensors provided for each individual cylinder or for a plurality of cylinders. Control unit 76 may also be connected to an operator panel (not shown) for issuing a warning to the operator, indicating a failure of the engine or the like.

FIG. 2 shows a cylinder 9 of a DF internal combustion engine 200 which is an exemplary embodiment of internal combustion engine 100 of FIG. 1. Elements already described in connection with FIG. 1 have the same reference numerals, such as engine block 2, control unit 76, pressure sensor 77, and cylinder 9.

Cylinder 9 provides at least one combustion chamber 10 for combusting a mixture of gaseous fuel and air, a piston 84, and a crankshaft 80 which is drivingly connected to piston 84 via a piston rod 82. Piston 84 is configured to reciprocate within cylinder 9.

Cylinder 9 is connected to charge air manifold 26 via inlet channel 28 and to exhaust gas manifold 34 via outlet channel 35 (see FIG. 1). Inlet valve 16 is disposed in inlet channel 28, and outlet valve 18 is disposed in outlet channel 35. Gaseous fuel admission valve 58 can supply gaseous fuel to combustion chamber 10 of cylinder 9.

FIG. 2 further illustrates fuel injection system 50 by a dashed box. When DF internal combustion engine 200 is operated in LFM, fuel injection system 50 is used to inject liquid fuel into combustion chamber 10, the liquid fuel being the sole source of energy. When DF internal combustion engine 200 is operated in GFM, fuel injection system 50 may be used to inject a pilot amount of liquid fuel into combustion chamber 10 to ignite the mixture of gaseous fuel and air. In GFM, fuel injection system 50 may therefore function as a gaseous fuel ignition system.

In FIG. 2, an exemplary embodiment of such a gaseous fuel ignition system is based on a main liquid fuel injector 38 for injecting a large amount of liquid fuel in LFM and a pilot amount of liquid fuel into combustion chamber 10 to ignite the mixture of gaseous fuel and air in GFM. In other embodiments, such as for heavy duty DF internal combustion engines, gaseous fuel ignition system may comprise a separate ignition liquid fuel injector 39 to inject the pilot amount of liquid fuel into combustion chamber 10 in GFM.

Cylinder 9 further comprises pressure sensor 77 to measure a temporal development of an internal cylinder pressure during the operation of the engine, for example, during combustion. Pressure sensor 77 may be a capacitive pressure sensor, an electromagnetic pressure sensor, a piezoelectric pressure sensor, an optical pressure sensor or any other pressure sensor known in the art. Pressure sensor 77 may be mounted at any location of cylinder 9 convenient for measuring the cylinder pressure during combustion. For example, pressure sensor 77 may be mounted within a cylinder side wall or at the cylinder head face. Pressure sensor 77 may reach at least partly into combustion chamber 10 of cylinder 9, for example through a bore in a cylinder side wall.

Pressure sensor 77 may further be disposed outside of the combustion chamber 10 to detect the cylinder pressure indirectly. For example, pressure sensor 77 may be mounted at an existing component of the engine, such as a bolt head, spark plug boss, etc. Pressure sensor 77 may sense stress of that component during combustion, the stress corresponding to the internal cylinder pressure during combustion.

DF internal combustion engine 200 additionally comprises a control system including control unit 76. Control unit 76 is connected to main liquid fuel injector 38 via control connection line 108 and, in case of heavy duty DF internal combustion engines, also to ignition liquid fuel injector 39 via a separate control connection line (not shown).

FIG. 3 shows a cylinder 9 of a gaseous fuel internal combustion engine 300 being another exemplary embodiment of internal combustion engine 100 of FIG. 1. Elements already described in connection with FIGS. 1 and 2 have the same reference numerals. Gaseous fuel internal combustion engine 300 is similar to DF internal combustion engine 200 of FIG. 2, except for the components described in the following.

Fuel injection system 50 comprises a pre-combustion chamber 90. Pre-combustion chamber is configured to receive a pre-mixture of gaseous fuel and air outside of combustion chamber 10. The pre-mixture of gaseous fuel and air is ignited, for example by a spark plug, to provide pilot flames 91 disposed into combustion chamber 10. Pilot flames 91 are used to ignite the mixture of gaseous fuel and air in combustion chamber 10. Control unit 76 is connected to pre-combustion chamber 90 via control connection line 110. Alternatively, fuel injection system 50 may be a spark plug for igniting the mixture of gaseous fuel and air via an electric discharge.

In general, control unit 76 of an engine as disclosed in connection with FIGS. 1 to 3 may be a single microprocessor or multiple microprocessors that include means for controlling, among others, an operation of various components of DF internal combustion engine 200. Control unit 76 may be a general engine control unit (ECU) capable of controlling numerous functions associated with DF internal combustion engine 200 and/or its associated components. Control unit 76 may include all components required to run an application such as, for example, a memory, a secondary storage device, and a processor such as a central processing unit or any other means known in the art for controlling DF internal combustion engine 200 and its components. Various other known circuits may be associated with control unit 76, including power supply circuitry, signal conditioning circuitry, communication circuitry and other appropriate circuitry.

Control unit 76 may analyze and compare received and stored data and, based on instructions and data stored in memory or input by a user, determine whether action is required. For example, control unit 76 may receive pressure data from pressure sensor 77, determine a burn rate profile and compare that burn rate profile with target values stored in memory, and, based on the results of the comparison, transmit signals to one or more components of the engine to alter the operation of the same.

INDUSTRIAL APPLICABILITY

Exemplary internal combustion engines suited to the disclosed control procedure are, for example, DF internal combustion engines of the series M46DF, M34DF and M43DF or gaseous fuel internal combustion engines of the series GCM34 and GCM46 manufactured by Caterpillar Motoren GmbH & Co. KG, Kiel, Germany, or other spark ignited open or pre-combustion chamber gaseous fuel engines. Respective internal combustion engines may be operated at 450-1500 rpm and may be applied, for example, in medium speed power generator sets, a propulsion system and/or compressor or pump drives. Other engines suited to the disclosed control procedure are, for example, gaseous fuel engines of the series 3600 and 3500, as well as other gas or dynamic gas blending engines manufactured by Caterpillar Inc., which are typically operated at speeds of up to 1500 rpm or even 3000 rpm. One skilled in the art would however appreciate that the disclosed control procedures may also be adapted to suit other internal combustion engines.

In the following, operation and control of an internal combustion engine during operation on at least partly gaseous fuel—such as internal combustion engines described with reference to FIGS. 1 to 3—are described in connection with FIGS. 4 to 6. For illustration purposes, the control procedures described herein are disclosed with reference to structural elements disclosed in FIGS. 1 to 3. However, the skilled person will appreciate that the respective steps of the control procedure can be performed on other embodiments as well.

Figure 4:
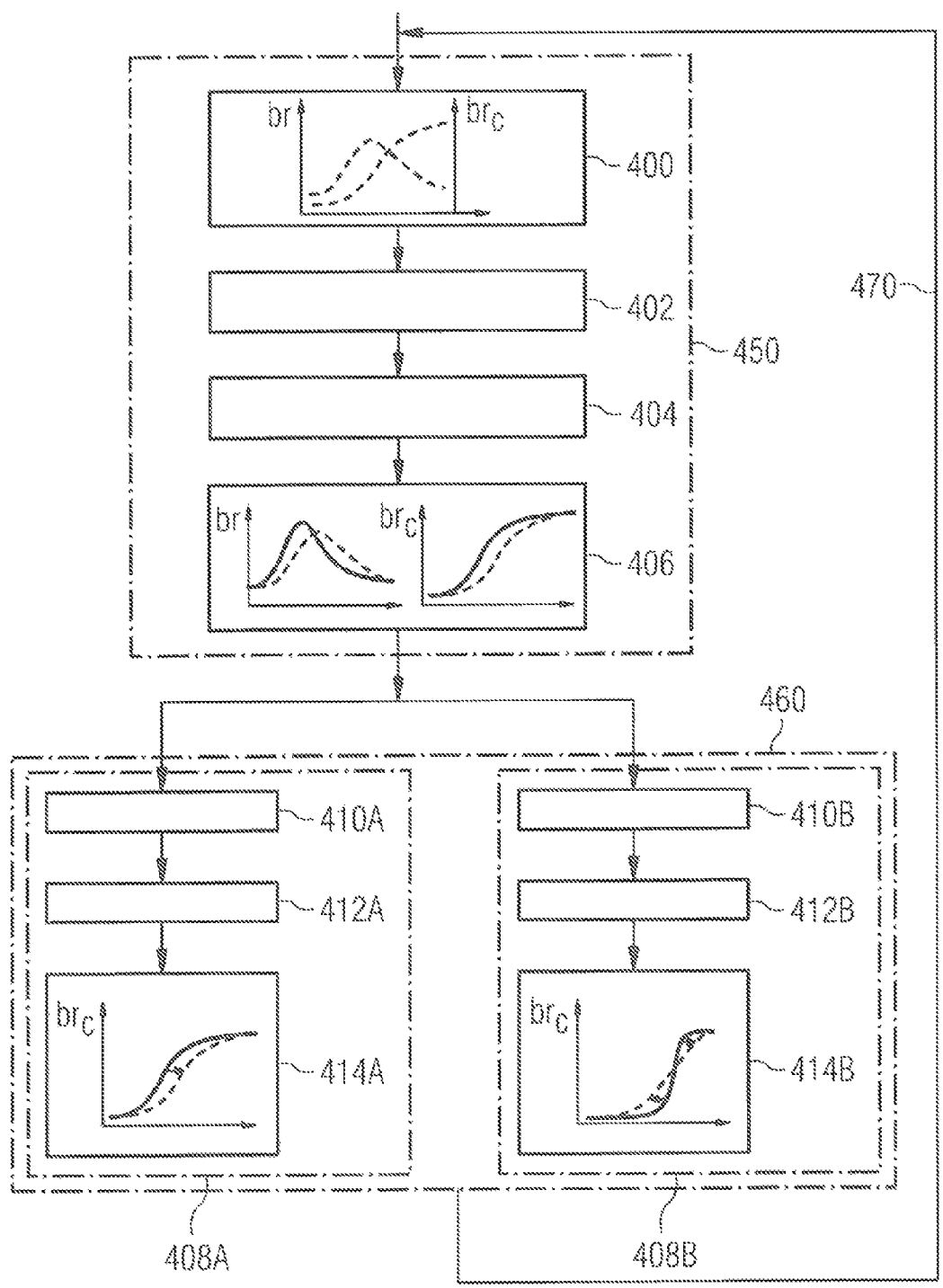
FIG. 4 shows a schematic flow diagram of an exemplary procedure for controlling an internal combustion engine.

FIG. 4 shows a schematic flow diagram of the disclosed control procedure. Control steps included in the flow diagram of FIG. 4 are described in connection with FIGS. 5 and 6.

Figure 5:
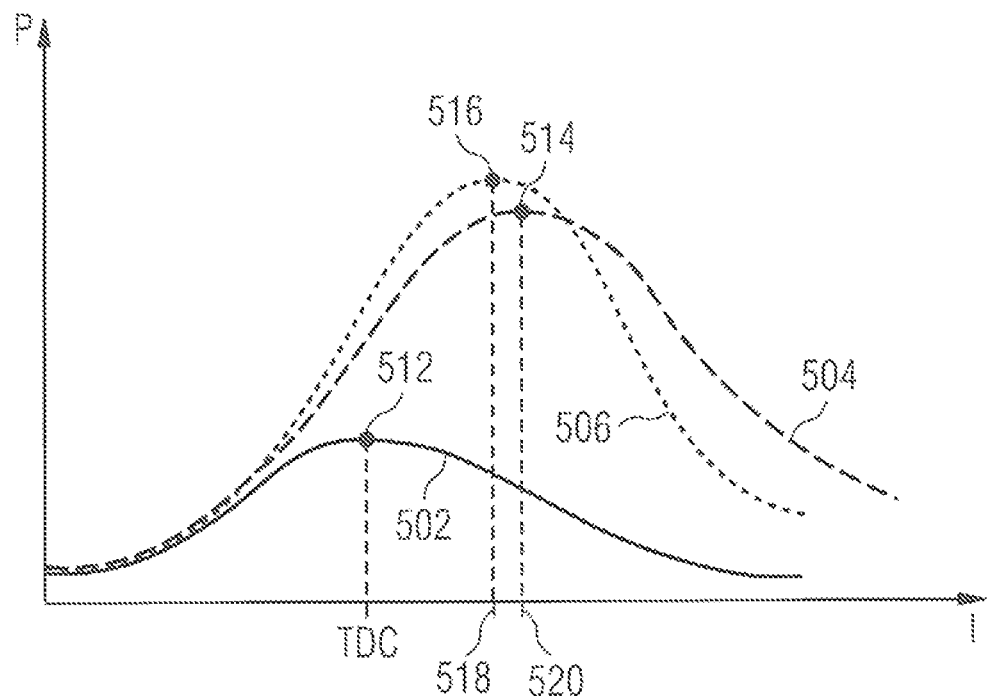
FIG. 5 shows an exemplary time-pressure diagram of a cylinder pressure for a variation in gas composition.

In FIG. 5, a set of three different cylinder pressure profiles 502, 504 and 506 is shown for various operating conditions of internal combustion engine 100. The skilled person will appreciate that the abscissa of cylinder pressure profiles 502, 504 and 506 may be given in any unit of time, such as milliseconds, seconds, minutes or degrees crank angle.

Cylinder pressure profile 502 (indicated by a solid line in FIG. 5) indicates a motored operation of internal combustion engine 100. In motored operation, no combustion occurs. As can be seen, cylinder pressure profile 502 illustrates an increase of pressure up to a certain maximum compression pressure 512, followed by a decay of pressure back to the initial pressure. The increase of pressure up to maximum compression pressure 512 corresponds to the compression of charge air or unignited fuel-air mixture during the upward movement of piston 84 in cylinder 9. When piston 84 reaches top dead center (TDC), cylinder pressure profile 502 approaches maximum compression pressure 512. Maximum compression pressure 512 may be for example about 100 bar. Cylinder pressure profile 502 can be measured or derived from the compression of charge air or unignited fuel-air mixture within cylinder 9 based on thermodynamic equations, such as equations for adiabatic compression or polytrophic compression. Additionally or alternatively, cylinder pressure profile 502 may be provided as an estimate or simulation and may be stored on the memory of control unit 76.

Cylinder pressure profile 504 (indicated by a dashed line in FIG. 5) represents a desired cylinder pressure profile during a desired operation of internal combustion engine 100 which would be obtained, if the internal combustion engine 100 was operated with first operating parameters on a first gas composition. The skilled person will appreciate that cylinder pressure profile 504 may depend on a load or speed of internal combustion engine 100. Desired operation of internal combustion engine 100, as within the meaning of this disclosure, generally refers to an optimal operation of internal combustion engine 100. For example, a desired operation of internal combustion engine 100 may refer to achieving an optimal performance of internal combustion engine 100 during operation of the same.

Compared to the motored operation illustrated by cylinder pressure profile 502, the heat release of the combustion causes the cylinder pressure to increase up to a maximum combustion pressure 514 far above maximum compression pressure 512 of motored operation. Additionally, maximum combustion pressure 514 occurs at times later than TDC due to the finite combustion time. An example value for maximum combustion pressure 514 may be 190 bar.

In FIG. 5, exemplary cylinder pressure profile 506 (indicated by a double-dashed line) may represent a cylinder pressure profile obtained for a second gas composition of the gaseous fuel admitted to cylinder 9 of internal combustion engine 100 for a single cylinder 9. Compared to cylinder pressure profiles 502 and 504, cylinder pressure profile 506 has a more pronounced increase and reaches a maximum combustion pressure 516 at a time 518 that is shorter than, for example, a time 520 of maximum combustion pressure 514. Additionally, maximum combustion pressure 516 may be higher than maximum combustion pressure 514, but not necessarily. Maximum combustion pressure 516 may even be smaller than maximum combustion pressure 514.

Cylinder pressure profile 506 may correspond to a gaseous fuel with a higher energy content, such as a gaseous fuel with a higher amount of higher hydrocarbons, or a lower amount of inert gases. The higher energy content of the gaseous fuel causes the fuel-air mixture to ignite faster, thereby causing a steeper increase of cylinder pressure and, as shown in this case, also a higher maximum combustion pressure 516 during operation of internal combustion engine 100. Again, cylinder pressure profile 506 shows a decreasing cylinder pressure at times after maximum combustion pressure 516 was reached.

Control unit 76 may obtain such cylinder pressure profiles as pressure data received from pressure sensor 77 via readout connection line 102. The pressure data may be available for discrete times, for example at intervals of 0.1° crank angle, or quasi-continuously depending on the temporal resolution of pressure sensor 77. Alternatively or additionally, the pressure data may correspond to not only one combustion event but to a plurality of combustion events. If the pressure data corresponds to a plurality of combustion events, control unit 76 may average the received pressure data such that, as a result, a cylinder pressure profile similar to cylinder pressure profiles 504 and 506 is obtained.

Once control unit 76 has obtained cylinder pressure profiles such as the ones shown in FIG. 5, control unit 76 may further—as a routine step—process the cylinder pressure profiles to obtain respective burn rate profiles. The term "burn rate", as within the meaning of this disclosure, represents the mass fraction of burnt fuel over time during a combustion event of one combustion cycle, expressed in percentage per unit crank angle or per unit time. Burn rate profiles are derived for each combustion cycle of internal combustion engine 100 from the pressure data received from pressure sensor 77.

Figure 6:
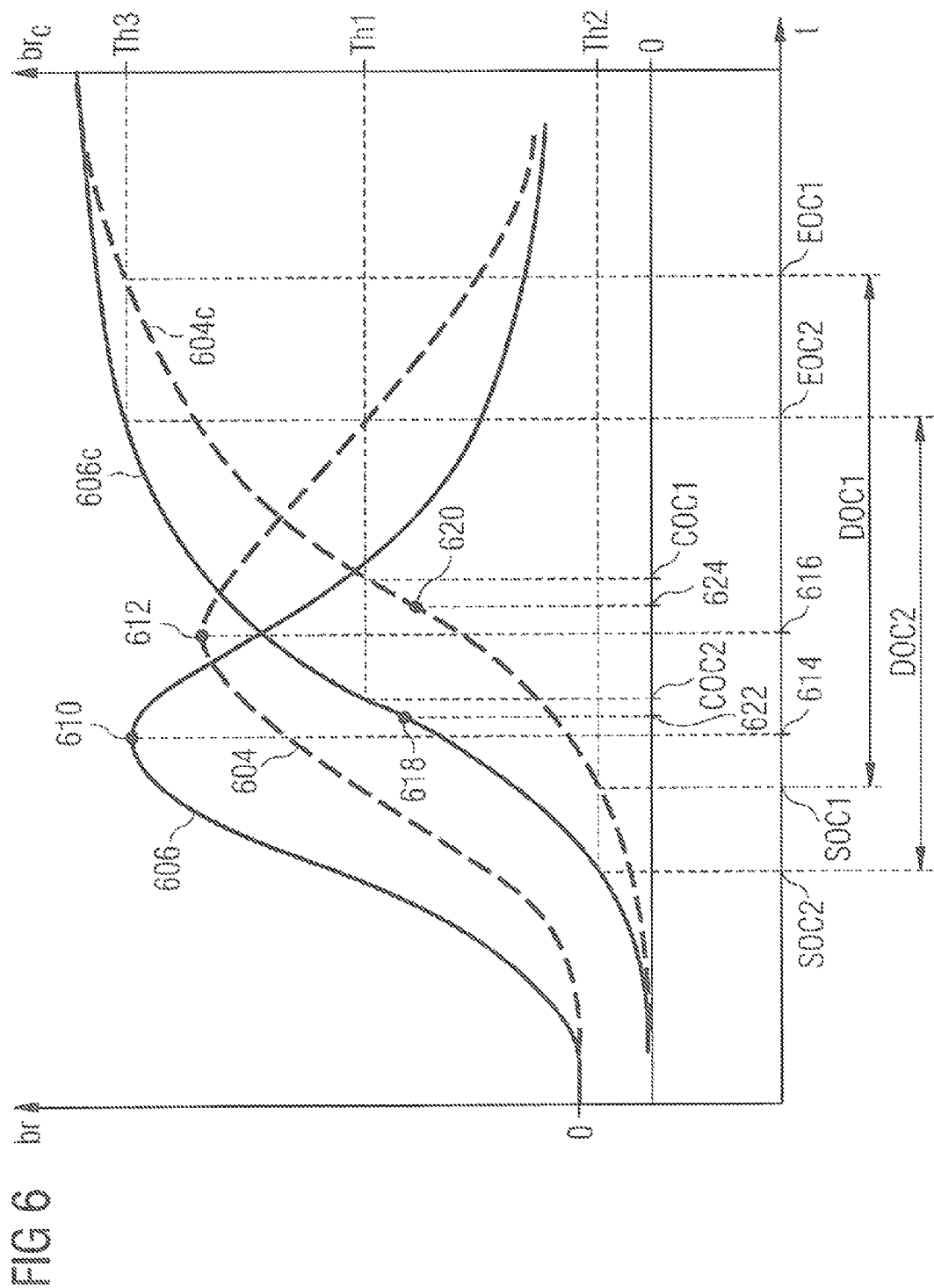
FIG. 6 shows an exemplary time-burn rate profile diagram that may be used to determine an adaption of operating parameters of the internal combustion engine in response to the variation in gas composition.

In FIG. 6, exemplary burn rate profiles are illustrated. FIG. 6 depicts two time-burn rate graphs of relative burn rate profiles 604 and 606, and two time-burn rate graphs of cumulative burn rate profiles 604c and 606c. The reader should note that, for clarity, the ordinate of cumulative burn rate profiles 604c and 606c is shifted with respect to the ordinate of relative burn rate profiles 604 and 606. Moreover, the ordinate of cumulative burn rate profiles 604c and 606c (indicated by "$br_c$") is shown on the right-hand side of FIG. 6 and the ordinate of relative burn rate profiles 604 and 606 (indicated by "br") is shown on the left-hand side. However, all four graphs have the same abscissa. The skilled person will appreciate that the abscissa may be given in any unit of time, such as milliseconds, seconds, minutes or degrees crank angle.

Control unit 76 may derive relative burn rate profiles such as relative burn rate profiles 604 and 606 from a difference between cylinder pressure profiles obtained during an actual combustion event in cylinder 9 (cylinder pressure profiles 504 and 506 of FIG. 5), and the cylinder pressure profile obtained during motored operation of internal combustion engine 100 (cylinder pressure profile 502 in FIG. 5) using respective equations.

Control unit 76 may further derive cumulative burn rate profiles 604c and 606c by integrating relative burn rate profiles 604 and 606, respectively, over time. As the relative burn rate corresponds to the mass fraction of burnt fuel per unit crank angle or time, the cumulative burn rate may also be derived by integrating the mass fraction of burnt fuel over time, which is why cumulative burn rate profiles typically have an "s"-like shape. Moreover, maximum cumulative burn rates should ideally approach 100%, as, in principle, the entire mass of fuel should be burnt at the end of one combustion cycle. In practice, however, due to, for example, crevices within combustion chamber 10, there is always a residual amount of unburnt fuel at the end of a combustion event. Thus, in practice, a maximum cumulative burn rate value typically approaches about 85% to 99.5%.

Additionally or alternatively, relative and cumulative burn rate profiles 604, 606 and 604c, 606c, respectively, may also be averaged over a number of combustion cycles, for example over at least 2 combustion cycles, such as 20 combustion cycles or more, to account for cycle-to-cycle variations.

For the sake of this disclosure it is assumed, that relative burn rate profile 604 was derived from cylinder pressure profiles 502 and 504. It should be recalled, that cylinder pressure profile 504 corresponds to a desired operation of internal combustion engine 100 for first operating parameters associated with a desired operation of internal combustion engine, and cylinder pressure profile 502 corresponds to motored operation. Thus, relative burn rate profile 604 may be a first relative burn rate profile corresponding to a desired relative burn rate profile. Because cumulative burn rate profile 604c is derived based on relative burn rate profile 604, also cumulative burn rate profile 604c may constitute a desired cumulative burn rate profile.

Further, it is assumed, that relative burn rate profile 606 and cumulative burn rate profile 606c were derived from cylinder pressure profiles 502 and 506. As cylinder pressure profile 506 was obtained during operation of internal combustion engine 100 on a second gas composition, relative burn rate profile 606 and cumulative burn rate profile 606c may constitute second burn rate profiles.

A more detailed description of relative burn rate profiles 604 and 606, and cumulative burn rate profiles 604c and 606c are given, when explaining the control procedure of FIG. 4.

In FIG. 4, the steps performed by control unit 76 for controlling internal combustion engine 100 subjected to a variation in gas composition are shown. The control procedure comprises an analysis section 450 and a control section 460 feeding back into analysis section 450 via loop 470. In analysis section 450, steps are performed for, inter alia, determining whether a variation in gas composition occurred and whether that change effects the operation of internal combustion engine 100. Control section 460 then comprises the steps which are necessary to adapt an operating parameter of internal combustion engine 100, once control unit 76 has determined that the variation in composition effects the operation of internal combustion engine 100.

At step 400 of analysis section 450, control unit 76 may be provided with a desired burn rate profile such as relative burn rate profile 604 and/or cumulative burn rate profile 604c. Moreover, at step 400, control unit 76 may be provided with first operating parameters that are selected such that internal combustion engine 100 would obtain first burn rate profiles corresponding to desired burn rate profiles 604, 604c, if operated on the first gas composition. Desired burn rate profiles 604, 604c and first operating parameters may be stored on the memory of control unit 76 or may be readily accessible by control unit 76.

As mentioned, desired burn rate profiles 604 and 604c correspond to a desired operation of internal combustion engine 100. Desired operation of internal combustion engine 100 may depend on a load, a speed, a power output, or an efficiency of internal combustion engine 100. Thus, desired burn rate profiles 604 and 604c and first operating parameters may also depend on a load, speed, power output, or an efficiency of internal combustion engine 100. Accordingly, sets of desired burn rate profiles 604, 604c and first operating parameters for various loads, speeds, power outputs or efficiencies of internal combustion engine 100 may be stored on the memory of control unit 76.

At step 402, internal combustion engine 100 is operated with the first operating parameters on the first gas composition, such that for these first operating parameters a first burn rate profile associated with the combustion process corresponds essentially to desired burn rate profiles 604 and 604c. In other words: The first operating parameters of internal combustion engine 100 correspond to the desired operation of internal combustion engine 100.

While being operated with these first operating parameters, control unit 76 of internal combustion engine 100 continuously monitors the burn rate profiles. As already mentioned, monitoring the burn rate profiles comprises continuously receiving pressure data corresponding to cylinder pressure profiles, such as cylinder pressure profile 506 of FIG. 5, and deriving relative and/or cumulative burn rate profiles, such as relative burn rate profile 606 and/or cumulative burn rate profile 606c of FIG. 6. The monitoring may occur over a time period in which the first gas composition changes to a second gas composition. The time period in which a variation in gas composition occurs may extend, for example, over at least 2 combustion cycles such as 20 combustion cycles or more, or may be several seconds to 120 min or more. Thus, at the end of the monitoring period internal combustion engine 100 is operated with the first operating parameters on the second gas composition (step 404).

At step 406, control unit 76 determines that a second burn rate profile, be it a relative or cumulative burn rate profile, differs from desired burn rate profiles 604 and/or 604c.

In the following the second burn rate profiles may be referred to as actual burn rate profiles, because second burn rate profiles constitute current burn rate profiles of internal combustion engine 100 derived by control unit 76.

Control unit 76 may determine that actual burn rate profiles differ from desired burn rate profiles by continuously calculating a difference between the actual burn rate profile derived from the pressure data and the desired burn rate profile provided, for example, on the memory. If the determined difference is also larger than a predefined threshold value, control unit 76 associates the determined difference with a variation of gas composition from the first gas composition to the second gas composition and determines that the first operating parameters can no longer be considered to correspond to the desired operation of internal combustion engine 100. If the determined difference is below the predefined threshold value, control unit 76 may associate the determined difference as insignificant and maintain the first operating parameters.

The threshold values for determining whether a difference does require a change in operating parameters may be stored on the memory of control unit 76 as predefined threshold maps or as correlations or equations, or may be a part of other maps stored on the memory of control unit 76.

Once control unit 76 has determined that a difference between the actual burn rate profile and the desired burn rate profile has occurred—and that this difference requires appropriate adaptions of the operating parameters—control procedure proceeds to control section 460.

In control section 460, control unit 76 initiates an adaption of one or more operating parameters of internal combustion engine 100. The adaption of the at least one operating parameter is initiated to ensure that—after the adaption has occured—a burn rate profile is obtained which is again adjusted to the desired burn rate profile. In other words: Control unit 76 changes an operating parameter such that a new burn rate profile is achieved that essentially corresponds to the desired burn rate profile.

Therefore, at step 408A, control unit 76 may adapt a first operating parameter that enforces a shift of actual burn rate profiles 606 and/or 606c towards desired burn rate profiles 604 and/or 604c, respectively. At step 408B, control unit 76 may adapt a second operating parameter that adjusts temporal spreads of actual burn rate profiles 606 and/or 606c to be essentially similar to temporal spreads of desired burn rate profiles 604 and/or 604c, respectively. Operating parameters that may be used for achieving the shift and changes of temporal spreads are, for example, an ignition timing, an air-to-fuel ratio, a charge air pressure, a gas admission duration, a gas admission pressure, a pre-combustion chamber gas supply pressure, a pre-combustion chamber gas supply duration, an ignition fuel injection pressure, and an ignition fuel injection duration of internal combustion engine 100.

The skilled person will appreciate that steps 408A and 408B may be performed in sequence, in reverse sequence, or simultaneously.

In an exemplary embodiment, the first operating parameter may be an ignition timing of internal combustion engine 100. The ignition timing is changed such that an actual center of combustion COC1 approaches a desired center of combustion COC2 (see FIG. 6). At step 410A, control unit 76 may therefore derive desired center of combustion COC1 by determining a center point in desired cumulative burn rate profile 604c. The center point is at a time that corresponds to a first threshold value Th1. First threshold value Th1 may be 50% of a maximum cumulative burn rate value. The time at which cumulative burn rate profile 604c approaches Th1—the time at which 50% of the maximum cumulative burn rate value occurs—is then associated with desired center of combustion COC1. Likewise, control unit 76 determines actual center of combustion COC2 in actual cumulative burn rate profile 606c by determining a center point at a time that corresponds to Th1—50% of the maximum cumulative burn rate value—with actual center of combustion COC2.

At step 412A, control unit 76 then determines a difference between the desired and actual center of combustion COC1 and COC2, respectively, and, at step 414A, control unit 76 adapts an ignition timing of internal combustion engine such that actual center of combustion COC2 approaches desired center of combustion COC1.

If actual center of combustion COC2 occurs at times after (before) desired center of combustion COC1, control unit 76 advances (delays) the ignition timing of cylinder 9.

In an exemplary embodiment, the second operating parameter which may be adapted by control unit 76 may be an air-to-fuel ratio of internal combustion engine 100. The air-to-fuel ratio is changed such that an actual combustion duration DOC2 approaches a desired combustion duration DOC1 (see. FIG. 6). At step 410B, control unit 76 may derive the desired and actual combustion durations DOC1, DOC2 by determining start points SOC1, SOC2 and end points EOC1, EOC2 of desired cumulative burn rate profile 604c and actual cumulative burn rate profile 606c, respectively. Start points SOC1, SOC2 and end points EOC1, EOC2 may correspond to cumulative burn rates at a certain preset threshold such as exemplary indicated by a second threshold value Th2 for start points SOC1, SOC2, and a third threshold value Th3 for end points EOC1, EOC2, respectively. Start points SOC1, SOC2 may therefore also be associated with a desired start of combustion SOC1 and actual start of combustion SOC2, respectively, and end points EOC1, EOC2 may be associated with a desired end of combustion EOC1 and an actual end of combustion EOC2, respectively.

To better cope with measurement uncertainties, and thus ensure a more robust evaluation by control unit 76, Th2 may be proximal to, but not identical with, 0% of a maximum cumulative burn rate value. Based on the same considerations, threshold value Th3 may be proximal to, but not identical with, the maximum cumulative burn rate value. For example, start points SOC1, SOC2 may be at a time corresponding to a cumulative burn rate value within a range between 0% and 25% of the maximum cumulative burn rate value, such as 10% of the maximum cumulative burn rate value. Likewise, end points EOC1, EOC2 may be at a time corresponding to a cumulative burn rate value within a range between 75% and 100% of the maximum cumulative burn rate value, such as 90% of the maximum cumulative burn rate value.

Control unit 76 associates the time span between start points SOC1, SOC2 and end points EOC1, EOC2 with the desired and actual combustion durations DOC1 and DOC2, respectively.

At step 412B, control unit 76 then determines a difference between desired and actual combustion durations DOC1 and DOC2, respectively, and, at step 414B, adapts the air-to-fuel ratio of cylinder 9 such that actual combustion duration DOC2 approaches desired combustion duration DOC1.

If actual combustion duration DOC2 is longer (shorter) than desired combustion duration DOC1, control unit 76 decreases (increases) the air-to-fuel ratio of cylinder 9.

Additionally or alternatively, the ignition timing may be adapted such that start point SOC2 of actual cumulative burn rate 606c approaches start point SOC1 of desired cumulative burn rate 604c, thereby adapting the actual start of combustion SOC1 to the desired start of combustion SOC2 and therewith causing the shift of actual burn rate profiles 606 and/or 606c towards desired burn rate profiles 604 and/or 604c, respectively.

The skilled person will appreciate that the adaption of the air-to-fuel ratio may not only adjust the combustion duration (DOC) but may also adjust the center of combustion (COC). Thus, additionally or alternatively, the adaption of the air-to-fuel ratio of internal combustion engine 100 may be such that actual combustion duration DOC2 and actual center of combustion COC2 approach desired combustion duration DOC1 and desired center of combustion COC1.

The skilled person will also appreciated that the adaption of the ignition timing, start of combustion, and/or air-to-fuel ratio may be performed within one adjustment step or within a plurality of adjustment steps, for example, by advancing or delaying the ignition timing stepwise over the plurality of adjustment steps, and/or by increasing or decreasing the air-to-fuel ratio over the plurality of adjustment steps.

Appropriate values for air-to-fuel ratios and/or ignition timings in response to a determined difference in the combustion duration, start of combustion, and/or center of combustion may be stored as predefined characteristic maps on the memory of control unit 76. Those predefined characteristic maps may also contain the aforementioned predefined threshold values for determining whether the determined difference requires appropriate adaption of the operating parameters or not.

The skilled person will appreciate that the adjustment of ignition timing and/or air-to-fuel ratio may be performed cylinder-specifically, for example for the cylinder associated with the difference in the center of combustion, start of combustion, and/or combustion duration, or the adjustment may be performed for a plurality of cylinders of internal combustion engine 100. Thus, the predefined characteristic maps may be provided for respective cylinders 9 of internal combustion engine 100.

In some embodiments, the adjustment of the ignition timing and/or the air-to-fuel ratio may be performed iteratively. Thus, no predefined characteristic maps are stored on the memory of control unit 76, but a difference between actual burn rate profiles 606, 606c and desired burn rate profiles 604, 604c are continuously determined for a stepwise adjustment of the ignition timing and/or the air-to-fuel ratio until actual burn rate profiles 606, 606c have approached desired burn rate profiles 604, 604c.

Additionally or alternatively, the predefined characteristic maps may be available for various operating parameters of internal combustion engine 100 such as for different loads, speeds or NOx emissions of internal combustion engine 100. Thus, adapting a first and/or second operating parameter in response to a variation in gas composition may take into account maintaining, for example, the load, speed or NOx emissions of internal combustion engine 100. Therefore, for example, the load or NOx emissions of the first operating condition of internal combustion engine 100 may be set as fixed parameters and control unit 76 may adjust the ignition timing and/or air-to-fuel ratio such that these fixed parameters are maintained. In some embodiments, control unit 76 may therefore communicate with a NOx sensor and continuously monitor NOx emissions of internal combustion engine 100.

Additionally or alternatively, further operating parameters such as a charge air pressure, a gas admission duration, a gas admission pressure, a pre-combustion chamber gas supply pressure, a pre-combustion chamber gas supply duration, an ignition fuel injection pressure, and an ignition fuel injection duration, as mentioned earlier, may be used to adjust the combustion duration, start of combustion, and/or center of combustion.

In some embodiments, control unit 76 may determine an extent of necessary adaption of the operating parameters based on an analysis of further actual burn rate profile parameters, as illustrated in FIG. 6, with respect to desired burn rate profile parameters. Burn rate profile parameters may be, for example, maximum burn rates 610, 612, and temporal positions 614, 616 of maximum burn rates 610, 612, respectively; maximum burn rate increases 618, 620, and temporal positions 622, 624 of maximum burn rate increases 618, 620, respectively; start points SOC1, SOC2, and end points EOC1, EOC2; as well as an ignition delay time associated with a time period between a start of injection of gaseous fuel and a start of combustion (SOC).

In some embodiments, the aforementioned pre-combustion chamber gas supply pressure, the pre-combustion chamber gas supply duration, the ignition fuel injection pressure, and the ignition fuel injection duration may be associated with an ignition energy for an Otto-gaseous fuel or Diesel-gaseous fuel internal combustion engine, respectively, and the ignition energy may be adapted to adjust, for example, maximum burn rate increase 618 and/or the ignition delay time of one or more cylinders 9 of internal combustion engine 100.

In some embodiments, control unit 76 may, alternatively or additionally, perform the above-mentioned control procedure based on a heat release rate of the combustion, wherein the heat release rate is obtained using respective equations.

In some embodiments, the first gas composition may change to the second gas composition without a monitoring period inbetween. This may be the case, for example, when the first gas composition is a nominal gas composition provided by the engine manufacturer during an initial operation of internal combustion engine at the manufacturer site, and internal combustion engine 100 is then shipped to the customer site providing internal combustion engine 100 with a gas composition different to the nominal gas composition.

The herein described control procedures are, for example, suitable for internal combustion engines operated in industrial power plants, such as generator sets on oil/gas platforms, where varying gas qualities may negatively affect the power output, or emissions such as NOx and unburnt hydrocarbons of the power plant. Using the herein disclosed aspects, internal combustion engines may run at operating conditions adapted to the current gas quality and, as a result, power output and/or NOx emissions of the internal combustion engine may be maintained despite a variation in gas composition.

Although the preferred embodiments of this invention have been described herein, improvements and modifications may be incorporated without departing from the scope of the following claims.

The invention claimed is:

1. A method for controlling an internal combustion engine operating on at least partly gaseous fuel, the method comprising:
    providing a desired burn rate profile corresponding to a desired operation of the internal combustion engine;
    selecting a set of operating parameters such that an operation of the internal combustion engine with a first gas composition produces a first burn rate profile that corresponds to the desired burn rate profile;
    operating the internal combustion engine with the set of operating parameters using a second gas composition;
    receiving pressure data corresponding to a cylinder pressure profile;
    deriving from the pressure data a 2nd burn rate profile; and
    deriving at least one of a relative burn rate profile and a cumulative burn rate profile for each combustion event, the cumulative burn rate profile being an accumulated relative burn rate profile over the duration of one combustion cycle
    determining the second burn rate profile differs from the desired burn rate profile thereby indicating that the second gas composition differs from the first gas composition;
    adjusting an ignition timing from among the set of operating parameters of the internal combustion engine to approach the desired burn rate profile.

2. A method for controlling an internal combustion engine operating on at least partly gaseous fuel, the method comprising:
    providing a desired burn rate profile corresponding to a desired operation of the internal combustion engine;
    selecting a set of operating parameters such that an operation of the internal combustion engine with a first gas composition produces a first burn rate profile that corresponds to the desired burn rate profile;
    operating the internal combustion engine with the set of operating parameters using a second gas composition;
    determining that the second burn rate profile differs from the desired burn rate profile thereby indicating that the second gas composition differs from the first gas composition;
    adjusting an operating parameter from among the set of operating parameters of the internal combustion engine to approach the desired burn rate profile; wherein
    adjusting the operating parameter comprises adjusting at least one of:
    a first operating parameter to shift a temporal position of the burn rate profile; and
    a second operating parameter to adjust a temporal spread of the burn rate profile,
    wherein each of the first operating parameter and the second operating parameter is one of ignition timing, air-to-fuel ratio, charge air pressure, gas admission duration, gas admission pressure, pre-combustion chamber gas supply pressure, pre-combustion chamber gas supply duration, ignition fuel injection pressure, and ignition fuel injection duration.

3. The method of claim 1, wherein adjusting the first operating parameter comprises:
    deriving from cumulative burn rate profile an actual center of combustion;
    determining a difference between the actual center of combustion (COC2) and a desired center of combustion (COC1) of the desired cumulative burn rate profile; and
    adjusting the ignition timing such that the actual center of combustion (COC2) approaches the desired center of combustion (COC1).

4. The method of claim 3, wherein deriving the center of combustion (COC2) further comprises:
    determining a center point of the cumulative burn rate profile at a time corresponding to 50% of a maximum cumulative burn rate value; and
    associating the center point with the center of combustion (COC2).

5. The method of claim 3, wherein adjusting the ignition timing comprises:
    determining that the actual center of combustion (COC2) corresponds to times after the desired center of combustion (COC1); and
    advancing the ignition timing of a cylinder associated with the determination that the actual center of combustion (COC2) corresponds to the times after the desired center of combustion (COC1).

6. The method of claim 1, wherein adjusting a second operating parameter comprises:
   deriving from the cumulative burn rate profile an actual combustion duration (DOC2);
   determining a difference between the actual combustion duration (DOC2) and a desired combustion duration (DOC1) of the desired cumulative burn rate profile; and
   adjusting an air-to-fuel ratio such that the actual combustion duration (DOC2) approaches the desired combustion duration (DOC1).

7. The method of claim 6, wherein deriving the actual combustion duration DOC2 further comprises:
   determining a start of combustion (SOC2) and an end of combustion (EOC2) of the cumulative burn rate profile; and
   associating the time span between the start of combustion and the end of combustion (EOC2) with the combustion duration (DOC2),
   wherein the start of combustion (SOC2) is at a time corresponding to the cumulative burn rate profile within a range from 0% to 25% of a maximum cumulative burn rate value, and
   the end of combustion (EOC2) is at a time corresponding to the cumulative burn rate profile within a range from 75% to 100% of the maximum cumulative burn rate value.

8. The method of claim 6, wherein adjusting the air-to-fuel ratio comprises:
   determining that the actual combustion duration (DOC2) is longer than the desired combustion duration (DOC1); and
   decreasing an air-to-fuel ratio of a cylinder associated with the determination that the actual combustion duration (DOC2) is longer than the desired combustion duration (DOC1).

9. The method of claim 1, wherein the method is performed cylinder-specifically or for a plurality of cylinders, wherein at least one of
   appropriate values for adapting the operating parameter such as the ignition timing and the air-to-fuel ratio are provided based on predefined characteristic maps provided for individual cylinders or for a plurality of cylinders,
   predefined characteristic maps depend on additional operating parameters of the internal combustion engine, such as on a load, a speed or NOx emissions, and
   adjusting the operating parameter such as the ignition timing and the air-to-fuel ratio is performed stepwise over a plurality of adjustment steps.

10. The method of claim 1, further comprising:
    determining an extent of the adjustment of the operating parameter based on an analysis of at least one of the following burn rate profile parameters:
    a maximum burn rate;
    a temporal position of the maximum burn rate;
    a maximum burn rate increase;
    a temporal position of the maximum burn rate increase;
    a start of combustion;
    a center of combustion;
    an end of combustion; and
    a combustion duration.

11. The method of claim 1, wherein determining that the second burn rate profile differs from the desired burn rate profile comprises:
    determining a difference between the second burn rate profile and the desired burn rate profile; and
    determining that the difference is beyond a predefined threshold value.

12. The method according to claim 1, further comprising:
    operating the internal combustion engine with the first operating parameters on the first gas composition; and
    monitoring a temporal development of a burn rate profile over a time period in which a variation in gas composition from the first gas composition to the second gas composition occurred such that the internal combustion engine is operated on the second gas composition while maintaining the first operating parameters.

13. An internal combustion engine during operation using at least partly gaseous fuel, the internal combustion engine comprising:
    an engine block;
    at least one cylinder disposed within the engine block and configured to combust the partly gaseous fuel;
    a pressure sensor configured to detect a cylinder pressure profile of the internal combustion engine; and
    a control unit connected to the pressure sensor and configured to:
    provide a desired burn rate profile corresponding to a desired operation of the internal combustion engine;
    select a set of operating parameters such that an operation of the internal combustion engine with a first gas composition produces a first burn rate profile that corresponds to the desired burn rate profile;
    operate the internal combustion engine with the set of operating parameters using a second gas composition;
    receive pressure data corresponding to a cylinder pressure profile;
    derive from the pressure data a second burn rate profile; and
    derive at least one of a relative burn rate profile and a cumulative burn rate profile for each combustion event, the cumulative burn rate profile being the accumulated relative burn rate profile over the duration of one combustion cycle
    determine whether a second burn rate profile obtained with the second gas composition differs from the desired burn rate profile;
    adjust an ignition timing from among the set of operating parameters of the internal combustion engine to approach the desired burn rate profile when the second burn rate profile differs from the desired burn rate profile.

14. The method of claim 1, wherein deriving the burn rate profile further comprises averaging the relative burn rate profile over a plurality of combustion cycles.

15. The method of claim 4, wherein adjusting the first operating parameter comprises:
    deriving from a cumulative burn rate profile an actual start of combustion (SOC2);
    determining a difference between an actual start of combustion (SOC2) and a desired start of combustion (SOC1) of the desired cumulative burn rate profile; and
    adjusting the ignition timing such that the actual start of combustion (SOC2) approaches the desired start of combustion (SOC1).

16. The internal combustion engine of claim 13, wherein the controller is configured to adjust the set of operating parameter by adjusting at least one of:
    a first operating parameter to shift a temporal position of the burn rate profile; and
    a second operating parameter to adjust a temporal spread of the burn rate profile, wherein each of the first operating parameter and the second operating parameter is one of ignition timing, air-to-fuel ratio, charge air pressure, gas admission duration, gas admission pressure, pre-combustion chamber gas supply pressure, pre-combustion chamber gas supply duration, ignition fuel injection pressure, and ignition fuel injection duration.

* * * * *